No. 817,549. PATENTED APR. 10, 1906.
H. E. COATES.
TOY.
APPLICATION FILED OCT. 14, 1905.
2 SHEETS—SHEET 1.
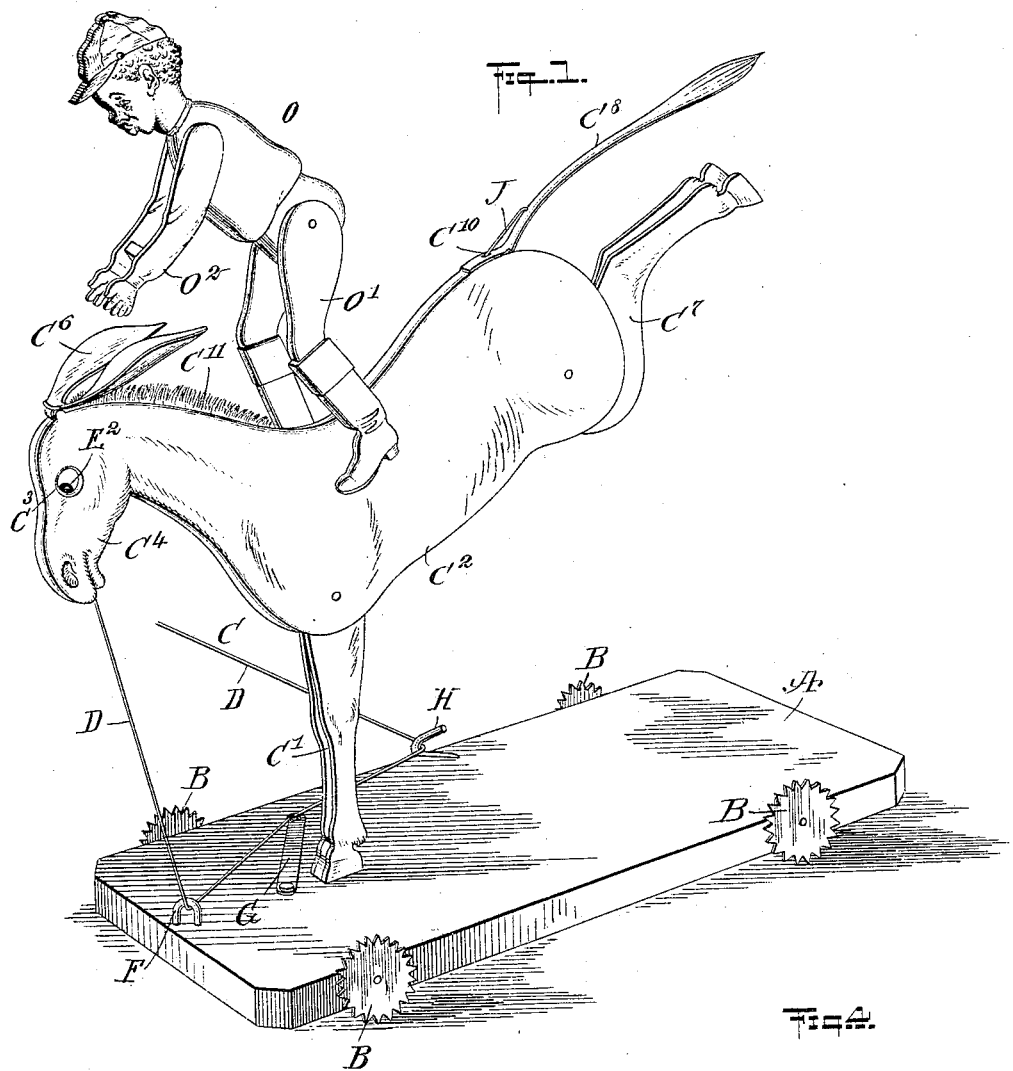
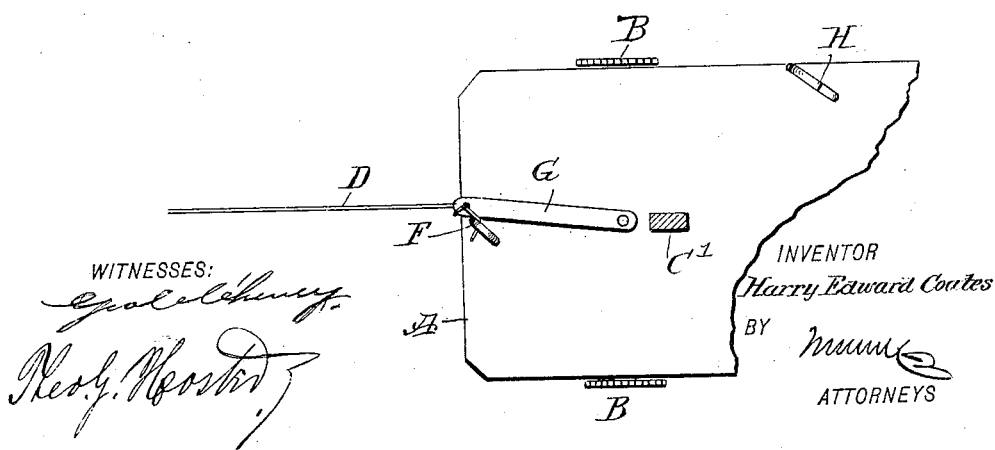
WITNESSES:
INVENTOR
Harry Edward Coates
BY
ATTORNEYS

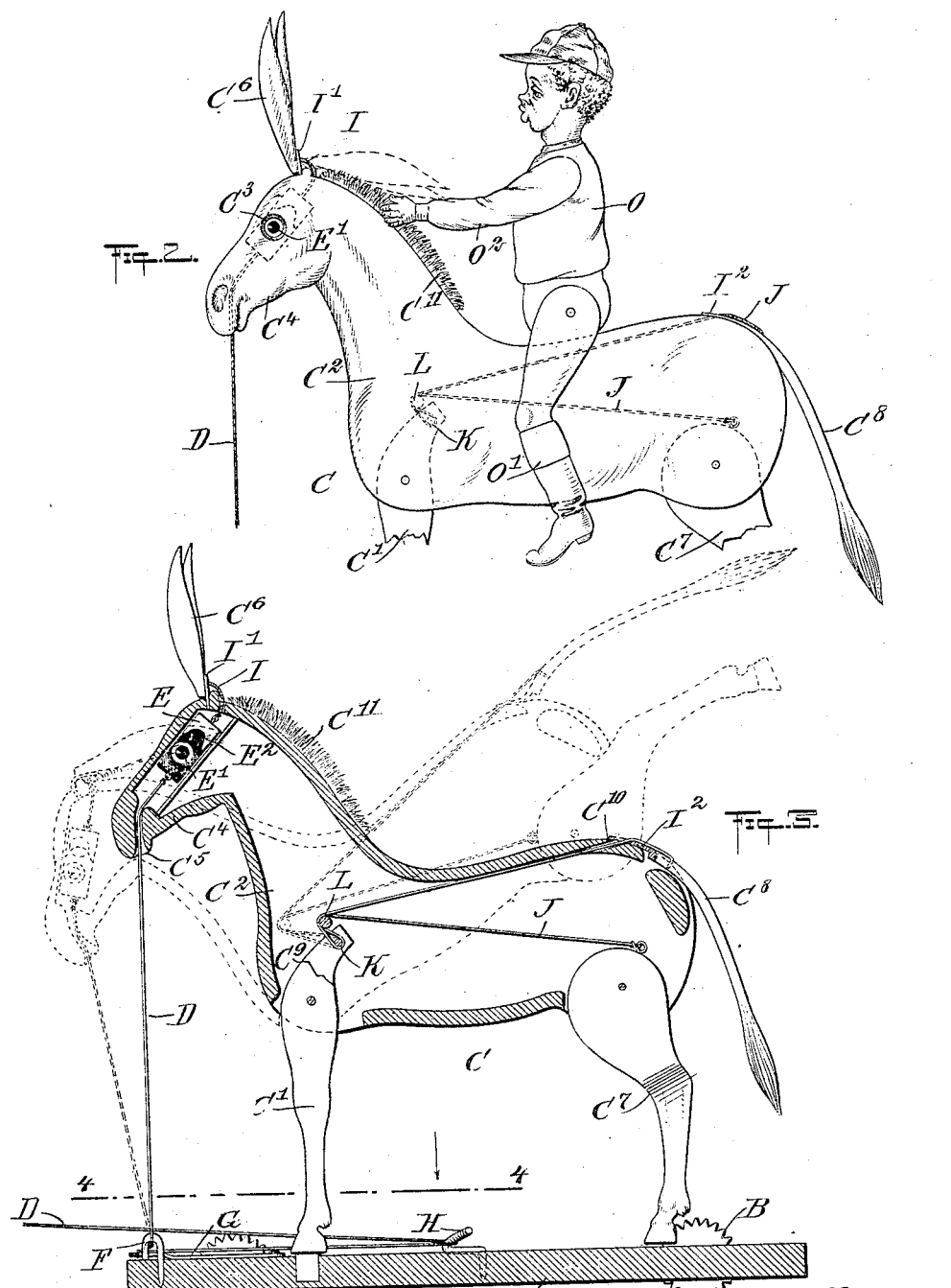

UNITED STATES PATENT OFFICE.

HARRY EDWARD COATES, OF SACRAMENTO, CALIFORNIA.

TOY.

No. 817,549.

Specification of Letters Patent.

Patented April 10, 1906.

Application filed October 14, 1905. Serial No. 282,735.

*To all whom it may concern:*

Be it known that I, HARRY EDWARD COATES, a citizen of the United States, and a resident of Sacramento, in the county of Sacramento and State of California, have invented a new and Improved Toy, of which the following is a full, clear, and exact description.

The object of the invention is to provide a new and Improved toy in the form of a bucking mule or like animal arranged to afford considerable amusement to children.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, showing the animal in bucking position. Fig. 2 is a side elevation of the same, showing the animal in normal position, Fig. 3 is a sectional side elevation of the same, and Fig. 4 is a sectional plan view of the actuating-gear for the animal, taken on the line 4 4 in Fig. 3.

A suitably-constructed base A is mounted on wheels B to permit of conveniently moving the toy about on the floor, the wheels being preferably in the form of toothed wheels to allow of holding the base A in position during the bucking movements of the animal C, mounted on the base A, as hereinafter more fully described.

The fore legs C' of the animal C are rigidly secured to the base A, and on the fore legs C' is fulcrumed the body $C^2$ to allow the body to swing from a normal position shown in Fig. 2 into a bucking position, as illustrated in full lines in Fig. 1 and in dotted lines in Fig. 3. For the purpose mentioned a rope D or other flexible connection is attached at one end to an eye-slide E, on the opposite sides of which are painted or otherwise produced a full eye E' and a half-eye $E^2$, either of which appears through an opening $C^3$, formed in the head $C^4$ of the animal C. The eye-slide E is mounted to slide in a diagonal direction in the head $C^4$, and the rope D extends from the slide E through the mouth-opening $C^5$ of the head $C^4$ to then pass downward and through an eye F, secured to the front middle portion of the base A.

A lever G, fulcrumed on the top of the base A, is attached at its free end to the rope D, which latter after leaving the lever G may be hooked onto a guideway H, secured to one side of the base A, as plainly shown in the drawings. When the rope D is engaged with the guideway H and a pull is exerted on the rope, then the lever G swings from a longitudinal into a transverse position, thus exerting a pull on that portion of the rope extending through the eye or guideway F to the slide E, whereby the latter is caused to slide in the head $C^4$, and when abutting with its lower end against a fixed portion of the head then a further pull on the rope D causes the body $C^2$ of the animal to swing into bucking position. (Illustrated in Fig. 1 and in dotted lines in Fig. 3.) When the body $C^2$ is in normal position, the full eye E' appears through the opening $C^3$; but when the slide E is moved on actuating the rope D, as above explained, then the half-eye $E^2$ appears in the opening $C^3$ to give the animal a ferocious appearance, as shown in Fig. 1. When the operator releases the pull on the rope D, the body C swings back by its own weight into normal horizontal position shown in Figs. 2 and 3.

The ears $C^6$ of the animal C are hinged on the head $C^4$ and are connected by a rope I or similar flexible connection with the upper end of the slide E, so that when the slide E moves in a downward and forward direction on pulling the rope D, as previously explained, then a rearward swinging motion is given to the ears $C^6$ to move the same from the normal approximately vertical position into a rearward or folded-down position, as indicated in Figs. 1 and 2. When the pull on the rope D is released, then the spring-hinge I' for the ears $C^6$ causes the latter to swing back into normal position, the spring-hinge being sufficiently strong to also draw the eye-slide E and the rope D back to normal position.

The rear legs $C^7$ of the animal C are fulcrumed on the body $C^2$, and the tail $C^8$ is connected by a spring-hinge $I^2$ with the body $C^2$ of the animal. A rope J or other flexible connection is attached at one end to the fulcrumed end of the rear legs $C^7$ and the other end of the said rope J is attached to the tail $C^8$ a distance beyond the hinge $I^2$. The rope J extends from the hind legs $C^7$ around a pin L, attached to the body $C^2$ of the animal, to then pass around a pin K, held on an upward extension $C^9$ of the fore legs $C^7$. The rope J after passing around the pin K again passes over the pin L to then extend through an opening $C^{10}$ at the back of the animal to connect with the tail $C^8$, as before mentioned. When the body $C^2$ is in a normal position, as shown in full lines in Fig. 3, then the hind legs $C^7$ extend downward and rest or nearly touch the base A, while the tail $C^8$ hangs in a normal position. When the body $C^2$ is swung into a bucking position, however, as before explained, then the rope J on account of passing over the pins L and K, of which the latter is stationary and the pin L moves with the body, a swinging motion is given to the rear legs $C^7$ and the tail $C^8$, so that the same swing upward into bucking position, as illustrated in Fig. 1.

From the foregoing it will be seen that the animal assumes a natural bucking position when the rope D is pulled, as the body as well as the eyes, ears, hind legs, and tail move simultaneously to produce the desired result.

A rider O, having hinged legs $O'$, may be seated on the body $C^2$ of the animal to straddle the body with the legs, the hands $O^2$ of the rider fitting opposite sides of the mane $C^{11}$ on the head $C^4$ of the animal to give considerable stability to the rider. It is evident, however, that when the rope D is successively pulled and released a number of times the rider O is finally dislodged and thrown off the animal, thus heightening the amusement of the children.

It is understood that when the rope D is not engaged with the guideway H and the rope is drawn forward, then the lever G swings forward against the eye or guideway F, so that on further drawing on the rope D the base A is drawn forward over the floor without causing a bucking action of the animal C—that is, the animal C remains in normal position while the base is wheeled over the floor. When the rope D is engaged with the guideway H and a pull is exerted on the rope, then the toy remains stationary, as the pull is exerted transversely and the teeth of the wheels B tend to hold the base A against transverse movement.

The toy is very simple in construction, can be cheaply manufactured, and is not liable to get easily out of order.

Having thus described my invention, I claim as new and desire to secure by Letters Patent—

1. A toy comprising a body having a fixed head and movable ears, tail and rear legs, fixed fore legs upon which the body is mounted to swing, an eye-slide in the head, a flexible connection leading from the eye-slide and means whereby traction upon the connection may move the eye-slide, swing the body upon the fore legs, and swing the rear legs, ears and tail upon the body.

2. A toy provided with a bucking animal, comprising a body, a head fixed on the body, fixed fore legs on which the body is mounted to swing, an operating flexible connection with the head of the body for imparting a swinging motion thereto, a fixed guideway for the flexible connection below the said head, a lever connected at its free end with the said flexible connection, and a second guideway for the said flexible connection arranged transverse to one side of the animal.

3. A toy provided with a bucking animal, comprising a body, a head fixed on the body, fixed fore legs on which the body is mounted to swing, rear legs mounted to swing on the said body, a tail mounted to swing on the body, a flexible connection between the said rear legs, tail and fixed fore legs, an eye-slide in the said head, and an operating flexible connection extending into the head and connected with the said eye-slide.

4. A toy provided with a bucking animal, comprising a body, a head fixed on the body, fixed fore legs on which the body is mounted to swing, rear legs mounted to swing on the said body, a tail mounted to swing on the body, a flexible connection between the said rear legs, tail and fixed fore legs, an eye-slide in the said head, an operating flexible connection extending into the head and connected with the said eye-slide, the ears of the said head being pivoted thereon, and a connection between the said ears and the eye-slide.

5. A toy provided with a bucking animal, comprising a body, a head fixed on the body, fixed fore legs on which the body is mounted to swing, an operating flexible connection with the head of the body for imparting a swinging motion thereto, and a rider straddling the said body and having spaced hands for engaging the mane on the animal's head.

6. A toy comprising a wheeled base, a bucking animal mounted on the said base, a flexible operating connection connected with the said animal, guideways on the said base for the passage of the flexible connection, and a lever fulcrumed on the said base and connected with the said flexible connection at a point between the said guideways.

In testimony whereof I have signed my name to this specification in the presence of two subscribing witnesses.

HARRY EDWARD COATES.

Witnesses:
C. E. SCHEUNERT,
C. C. GEIGER.